(12) United States Patent
Patrick et al.

(10) Patent No.: US 8,069,097 B2
(45) Date of Patent: Nov. 29, 2011

(54) MEDIA INVENTORY SERVICE

(75) Inventors: John E. Patrick, Monument, CO (US); Charles F. Kocsis, Colorado Springs, CO (US)

(73) Assignee: Harris Corporation, Melbourne, FL (US)

(*) Notice: Subject to any disclaimer, the term of this patent is extended or adjusted under 35 U.S.C. 154(b) by 763 days.

(21) Appl. No.: 12/133,647

(22) Filed: Jun. 5, 2008

(65) Prior Publication Data

US 2009/0302108 A1 Dec. 10, 2009

(51) Int. Cl.
G06Q 10/00 (2006.01)

(52) U.S. Cl. .......................... 705/28; 705/14.4

(58) Field of Classification Search ............... 705/14.69, 705/28, 14.1, 14.4
See application file for complete search history.

(56) References Cited

U.S. PATENT DOCUMENTS

| 6,567,824 B2 | 5/2003 | Fox | |
|---|---|---|---|
| 2005/0060229 A1* | 3/2005 | Riedl et al. ................. | 705/14 |
| 2005/0222865 A1 | 10/2005 | Fox | |
| 2005/0278736 A1 | 12/2005 | Steelberg et al. | |
| 2006/0212901 A1 | 9/2006 | Steelberg et al. | |
| 2006/0212916 A1 | 9/2006 | Steelberg et al. | |
| 2006/0282533 A1 | 12/2006 | Steelberg et al. | |
| 2008/0021792 A1 | 1/2008 | Steelberg et al. | |
| 2008/0022301 A1 | 1/2008 | Aloizos | |
| 2008/0256568 A1* | 10/2008 | Rowland ..................... | 725/22 |

* cited by examiner

*Primary Examiner* — Olabode Akintola
(74) *Attorney, Agent, or Firm* — Tarolli, Sundheim, Covell & Tummino LLP

(57) ABSTRACT

One embodiment relates to a computer-implemented media inventory service that includes instructions for performing a method. The method can include selectively extracting inventory data from at least one media management system based on an agency identifier that defines a subset of the inventory data in the at least one media management system made available for a given agency. Agency inventory data is provided based on the extracted inventory data for use by the given agency, the agency inventory data enumerating at least one inventory spot available for the given agency. At least one request from the given agency is received for the at least one inventory spot a portion of the inventory data in the at least one media management system is caused to be modified according to the at least one request.

25 Claims, 4 Drawing Sheets

MEDIA INVENTORY SERVICE

TECHNICAL FIELD

The present invention relates generally to media and, more particularly, to a service that facilitates scheduling distribution of media inventory.

BACKGROUND

Mass media, which can include television, cable, satellite, radio, internet and other forms of media, are often designed to reach large audiences with a variety of content. The type of content tends to vary depending upon the manner of distribution for the media. Many broadcasters and other media distributors often use advertising as a source of revenue to enable them to continue distribution of their respective media. For instance, television and radio programs can be distributed through radio broadcasting or cable as well as through internet streaming media services. Ads can be inserted between segments of program content. Alternatively, certain the media can comprise only ads or informational content, such as digital signage. The media distributors consider that each available slot for advertising content represents inventory or commodities that can be sold. Thus, the media distributors operate as inventory owners that sell their inventory to prospective purchasers, such as advertisers or others, which provide advertising content that can be inserted into the respective slots. The slots that provide ad opportunities are often termed avails or spots.

A variety of different traffic and billing systems have been developed. The inventory owners also utilize one or more automation system that provides for the automatic distribution of media content, including program content and advertising content, over a set of channels. Many inventory owners employ one or more different traffic and billing system to schedule, track and manage their inventory of advertising spots.

SUMMARY

The invention relates generally media and, more particularly, to a service that facilitates scheduling distribution of media inventory.

In one embodiment, the invention includes a media inventory service that provides any number of one or more agencies with access to a selected subset of available media inventory spots. The media inventory spots reside (e.g., they are stored in a log or other database structure) in one or more media management systems. One or more media inventory owner can employ a media management system to schedule distribution of media content to an audience over any number of channels. Such media content can include program content, advertising content or a combination of program content and advertising content. The agencies thus can employ the media inventory service to access the subset of spots that have been made available to each given agency. The agencies can also utilize the media service to send a request (e.g., for booking a spot or placing an order) for an available inventory spot into the media inventory of the media management system. The media inventory service can also provide each given agency with relevant as-run information for the spots or orders that the given agency has requested via the media inventory service.

As a further example, the media inventory service can be implemented as a web service that is accessible by one or more agencies. The media inventory service can also operate across a plurality of different media management systems and a plurality of different automation systems, which further can be implemented by any number of one or more different inventory owners (e.g., broadcasters). Each inventory owner thus can employ a user interface in a media management system to identify each spot of media inventory which is to be made available to each given agency through the media inventory service.

One embodiment of the invention relates to a computer-implemented method that can include selectively extracting inventory data from at least one media management system based on an agency identifier that defines a subset of the inventory data in the at least one media management system made available for a given agency. Agency inventory data is provided based on the extracted inventory data for use by the given agency, the agency inventory data enumerating at least one inventory spot available for the given agency. At least one request from the given agency is received for the at least one inventory spot a portion of the inventory data in the at least one media management system is caused to be modified according to the at least one request.

Another embodiment of the invention relates to a media inventory system that includes an inventory extractor programmed to access a copy of media inventory data from the at least one media management system corresponding to a selected subset of the inventory data in the at least one media management system that has been tagged via the at least one media management system as being available for a given agency. The inventory extractor is programmed to provide agency inventory data corresponding to the selected subset of the inventory data for use by the given agency. A request processor is programmed to receive at least one request from the given agency for at least one inventory spot corresponding to at least a portion of the agency inventory data provided by the inventory extractor, the request processor causing selected inventory data in the at least one media management system to be modified according to the at least one request.

Yet another aspect of the invention provides a computer system that includes a first computer that executes instructions for performing a method that comprises:

providing agency specific inventory data corresponding to a copy of tagged inventory data from inventory data stored in a plurality of media management systems, the agency specific inventory data enumerating a set of at least one inventory spot made available for a given agency;

causing selected inventory data in at least one of the plurality of media management systems to be modified according to at least one request received from the given agency; and The computer system includes a second computer that executes instructions for providing the at least one request via an interface that provides access to the method of the first computer, the second computer being in communication with the first computer via a network.

DETAILED DESCRIPTION

Figure 1:
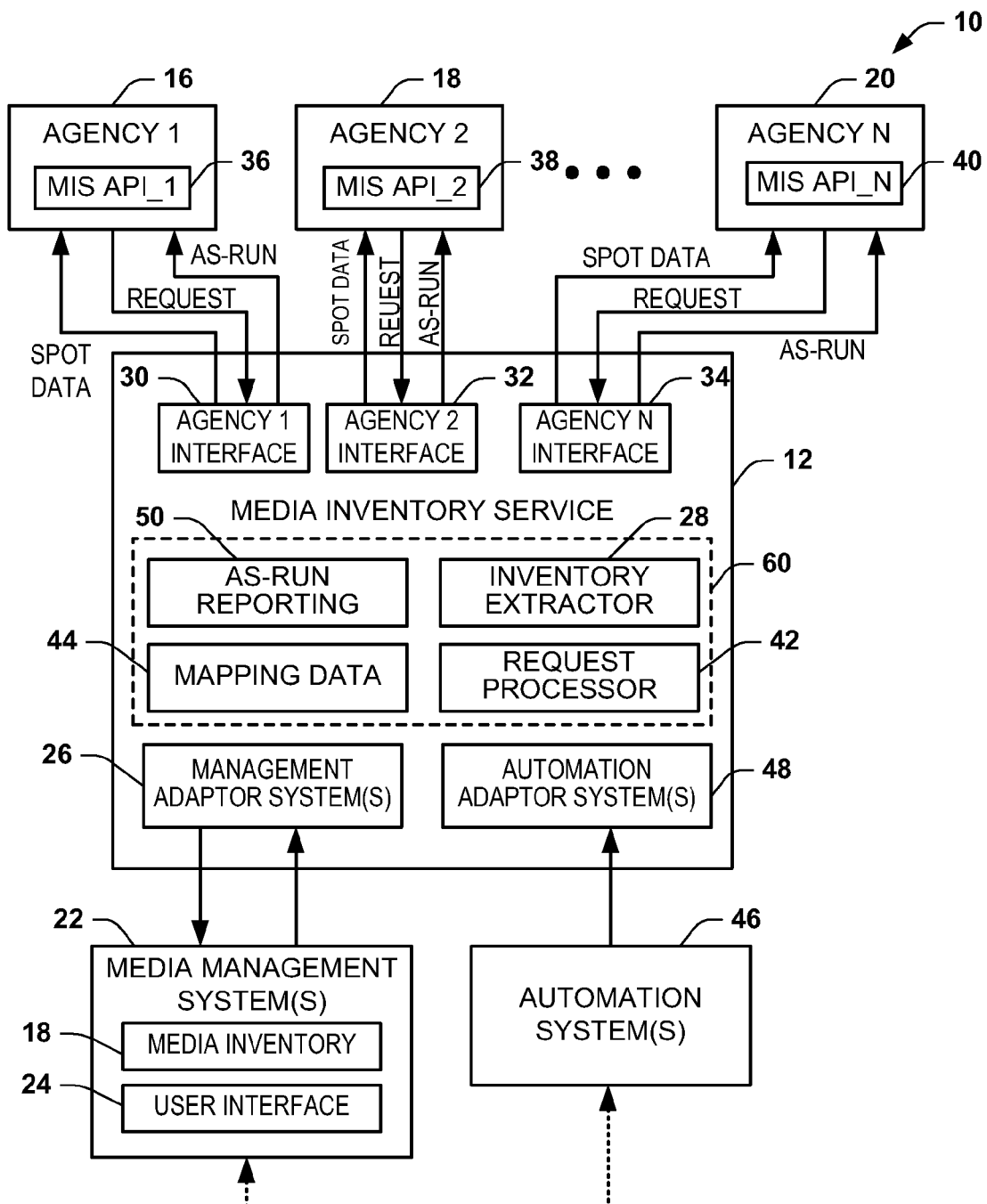
FIG. 1 depicts an example of a system that includes a media inventory service implemented according to an aspect of the invention.

The invention relates generally media and, more particularly, to a service that facilitates scheduling distribution of media inventory. In one embodiment, the invention includes a media inventory service that provides any number of one or more agencies with access to a selected subset of available media inventory spots. The media inventory spots reside (e.g., they are stored in a log or other database structure) in one or more media management systems. One or more media inventory owner can employ a media management system to schedule distribution of media content to an audience over any number of channels. Such media content can include program content, advertising content or a combination of program content and advertising content. The agencies thus can employ the media inventory service to access the subset of spots that have been made available to each given agency. The agencies can also utilize the media service to send a request (e.g., for booking a spot or placing an order) for an available inventory spot into the media inventory of the media management system. The media inventory service can also provide each given agency with relevant as-run information for the spots or orders that the given agency has requested via the media inventory service.

In one embodiment, the media inventory service can be implemented as a web service that is accessible by one or more agencies, such as via an application programming interface (API) for the media inventory service. The media inventory service is programmed to selectively extract inventory data from at least one media management (e.g., traffic) system based on a tag associated with the subset inventory data. The tag can correspond to an identifier for a given agency that can be entered into a predetermined data field for each spot that the inventory owner is making available to the given agency. The tag can be used as a means for defining a subset of the inventory data in the at least one media management system that is available for a given agency. The media inventory service can also be programmed to provide agency inventory data based on the extracted inventory data for use by the given agency. The agency inventory data enumerates a set of at least one inventory spot that has been made available for the given agency. The media inventory service is also programmed to receive requests from the given agency for corresponding inventory spots (e.g., as enumerated in the agency inventory data). Responsive to the requests, the media inventory service can cause selected inventory data in the at least one media management system to be modified according to the at least one request, such as to book or order advertising content. The requests can identify and/or include actual copy that is to be played in the inventory spot.

The media inventory service can operate across a plurality of different media management systems that can encompass any number of channels. In this way, media inventory can be tagged accessible by a given agency, such that each given agency can employ the media inventory service to receive media inventory data from and send requests for spots to the different media management systems. It is further appreciated that the media inventory service further may be utilized by media management systems for a plurality of different inventory owners (e.g., broadcasters). The media inventory service can operate to ensure that inventory and related information that is available to each given agency corresponds to only a portion of inventory, such as according to terms agreed upon by the agency and each inventory owner. These terms can be programmed into a control data structure utilized by the media inventory service. It will thus be appreciated that the media inventory service can enable inventory owners to publish selected subset of inventory and as-run information for access by third party agency services, while still remaining in control of their inventory as well as related sensitive or proprietary information.

As will be appreciated by those skilled in the art, portions of the invention may be embodied as a method, data processing system, or computer program product. Accordingly, these portions of the present invention may take the form of an entirely hardware embodiment, an entirely software embodiment, or an embodiment combining software and hardware. Furthermore, portions of the invention may be a computer program product on a computer-usable storage medium having computer readable program code on the medium. Any suitable computer-readable medium may be utilized including, but not limited to, static and dynamic storage devices, semiconductor storage devices, optical storage devices, and magnetic storage devices, such as hard disks.

Certain embodiments of the invention are described herein with reference to flowchart illustrations of methods, systems, and computer program products. It will be understood that blocks of the illustrations, and combinations of blocks in the illustrations, can be implemented by computer-executable instructions. These computer-executable instructions may be provided to one or more processor of a general purpose computer, special purpose computer, or other programmable data processing apparatus (or a combination of devices and circuits) to produce a machine or system, such that the instructions, which execute via the processor, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

FIG. 1 depicts an example of a system 10 implementing a media inventory service (MIS) 12 according to an aspect of the invention. The MIS 12 facilitates access to media inventory 14 by a plurality of agencies 16, 18 and 20, indicated at Agency 1, Agency 2, and Agency N, where N is a positive integer denoting the number of agencies subscribing to the media inventory service 12. The media inventory 14 is managed and controlled by a media management system 22. The system 10 can include any number of one or more disparate types of the media management systems 22. Each media management system 22 includes a user interface 24 that can be utilized to set attributes associated with the media inventory 14. The attributes, for example, can include information that describes channel and schedule characteristics, break characteristics, media content characteristics, as well as any other information deemed pertinent to scheduling distribution of media to an audience. According to an aspect of the invention, one or more of such attributes can be designated and used (e.g., by the inventory owner or other authorizer user) to tag data in the media inventory that is to be accessible to each respective agency.

Examples of some media management systems include the traffic systems commercially available from Harris Corporation of Melbourne, Fla., including PARADIGM, OSI-TRAFFIC, BROADCAST MASTER, NOVAR, LANDMARK, and BMS traffic systems. Those skilled in the art will understand that a variety of other traffic systems, which may be available individually or a part of an integrated system, are available from other entities currently or in the future. The MIS 12 can be programmed to operate with any of these and other media management systems according to an aspect of the invention. These and other media management systems enable media distributors to manage various aspects of associated with the media inventory ranging from, for example, proposal to order, inventory to scheduling, and reconciliation to billing. The media distributors (or inventory owners) that employ the media management system 22 can include broadcasters, global cable networks, cable MSOs, digital signage network providers and other media businesses.

The MIS 12 can include a management adapter system 26 that is programmed to provide access to each of the media management systems 22. The management adapter system 26 can include one or more interfaces and/or logic programmed to enable communication between the MIS 12 and a respective one of the media management system 22. In response to core methods running in the MIS 12, the adapter system 26 may invoke one or more access control methods or stored procedures of the media management system, such as by a call to such procedure. The stored procedures, for instance can be utilized by the MIS 12 to retrieve and send inventory data (e.g., for each of the agencies 16, 18 and 20) from and to the media inventory 14.

Thus, each of the agencies 16, 18 and 20 can obtain a selected portion of media inventory 14 from one or more media management systems 22. As described herein, the inventory owner can employ user interface 24 of the media management system 22 to tag the media inventory 14 to identify a selected subset of the media inventory that is being made available for access by each of the respective agencies 16, 18 and 20. The tagging of media inventory can correspond to associating a unique identifier for each agency with each of the spots that are being made available to each respective agency. For instance, agency 1, agency 2 and agency N 20 each can be assigned a unique agency identifier that can be inserted into or otherwise associated with the scheduling data for a set of one or more spots for one or more channels. As one example, the agency identifier (or tag) can be entered via the user interface 24 into a predetermined field, such as a "break characteristic" field of an inventory record for each inventory data record that is being made available to an agency 16, 18 or 20. Alternatively, a media inventory data object can be modified to include a field designated for such agency identifier, which can be set to a value for tagging each inventory data record that is being made available to a respective agency 16, 18 or 20. Typically, only a single agency identifier or tag will be assigned to a given available spot by an inventory provider. However, it will be understood and appreciated that, in other embodiments, an inventory owner may tag a given spot (or a plurality of spots) of media inventory with more than one agency identifier, such as to create a different operating paradigm in which multiple agencies can compete and request purchase of each such spot.

By way of example, an inventory owner, such as a radio or television broadcaster or cable network provider or other media distribution entity, may utilize a plurality of different traffic systems 22 to manage scheduling distribution of its media inventory 14. The media inventory 14 can include any number of one or more different types of media such as mentioned herein. The media inventory 14 further can include a plurality of channels, each channel having a respective schedule that identifies media inventory, duration and other attributes associated with scheduling and distribution of media. One or more advertising unit can be scheduled for each avail or spot according to contract terms reached between the inventory owner (or an affiliate or other entity operating on behalf of or with the authorization of the inventory owner) and a respective advertiser.

Typically, advertising spots or avails are sold to advertisers through marketing programs within or external to the inventory owners' business. As used herein, the term "agency" and its variants is intended to encompass any business entity or one or more computer system under control of such entity that has been afforded access or receive information about available media inventory through the MIS 12. The extent of the access to such available media can be defined by an inventory owner or by an entity on behalf of the inventory owner. For example, each agency can have agreements with inventory owners or otherwise can be afforded access to a subset of the media inventory, which each agency can utilize or resell to prospective buyers. For example, a given agency 16, 18 or 20 can enter into an agreement with an inventory owner to have access to some predetermined number (or range) of advertising spots in a predetermined set and number of channels. Thus, in the example of FIG. 1, an agency does not have unlimited access to the media inventory 14 through the media management system 22; although, a given agency can employ its own media management system that may be accessible by other agencies.

As discussed herein, the inventory owner can employ the user interface 24 to identify or tag a selected subset of inventory spots on a set of channels that are being made available to a given agency 16, 18 or 20 according to the agreement between the parties. According to an aspect of the invention, the inventory owner may employ a plurality of traffic systems, and can tag inventory spots via corresponding user interfaces for each such traffic system. A particular mechanism utilized to tag each inventory spot can vary according to the particular implementation of the media management system 22.

The MIS 12 employs a management adapter system 26 that is programmed to provide access to the media inventory 18 of each of the respective media management systems 22. For example, the management adapter system 26 can be implemented as one or more API or logic functions that can be utilized by the MIS 12 to call one or more stored procedure of the media management system 22, such as procedures associated with the database that contains the media inventory 14. The stored procedures can be employed for access control to the media inventory 14 as well as for validation of records or other data that is provided from the MIS to the media management system 22. Since the media management system 22 can include a plurality of different traffic systems, the management adapter system 26 can include a specific adapter programmed to interface with each such traffic system.

The media inventory service 12 includes an inventory extractor 28 that is programmed to access a selected subset of inventory for a given agency 16, 18 or 20 from the available media inventory 14 in the media management system 22. The inventory extractor 28 issues an extraction request to the media management system 22 through the appropriate management adapter system 26. The extraction request can include the unique identifier or tag (or other identifying information) that has been previously associated with the given agency 16, 18 or 20. The adapter 26 in turn calls an appropriate stored procedure that returns results of the request, which includes a selected subset of the media inventory, to the inventory extractor 28. The inventory extractor 28 provides a set of available inventory to the respective agency 16, 18 or 20 according to the results of the request provided through the management adapter system 26. Since the set of available inventory published by the inventory extractor to a respective agency 16, 18 or 20 is limited to the set of inventory that has been tagged by the inventory provider, the inventory owner can remain in control of its inventory. That is, only the set of one or more avails or spots that are relevant to a given agency will be published to each given agency.

The extractor 28 can provide the agency available inventory to each of the agencies 16, 18 and 20 in a predetermined format. The predetermined format may be a generic common format for all agencies. Alternatively, the agency available inventory data can be converted into a particular format according to requirements of each respective agency. The media inventory service 12 also includes an agency interface 30, 32 and 34 that is associated with each respective agency 16, 18 and 20. Each agency interface is programmed to facilitate communication between the MIS 12 and the agencies 16, 18 and 20. The agency interfaces can also perform conversion of the data from the extractor 28 into an agency specific format.

In order to utilize the media inventory service 12, each respective agency 16, 18 and 20 can include a MIS application interface (API) indicated at 36, 38 and 40, respectively. Thus each respective agency 16, 18 and 20 can employ a corresponding API to extract inventory that has been targeted for the respective agency as well as request or send other information from or to the MIS 12. Each API can provide access to the same functions of the MIS. That is, a single API can be designed to provide a plurality of different agencies with access to the MIS core functionality. Alternatively, it will be understood that different API's may be programmed to control access to a particular set of functions and methods, which can be varied to provide multiple levels of service.

The media inventory service 12 can also include a request processor 42 that is programmed to process requests from each of the respective agencies 16, 18 and 20. Thus a given agency 16, 18 or 20 can employ its respective API 36, 38 or 40 to place a request for one or more advertising spot into the avails that have been tagged for the respective agency. The request processor 42 receives the request from the agency, which includes a selected set of attributes. The request processor 42 processes the request and sends the processed request to the management adapter system 26. The management adapter system 26 invokes a stored procedure to place the request into the media inventory of the media management system 22 for the spot identified in the request. The request processor 42 and the management adapter system 26 can cooperate to ensure that the request for the spot being booked by the agency is in the appropriate format and includes the necessary fields required by the management system 22. The media management system 22 can also provide a message to each of the agencies 16, 18 and 20 to acknowledge that a request for a given spot has been placed and entered into the media inventory 14 of the media management system. This message can be provided through the MIS 12 or it can be triggered by the request and sent via other means (e.g., email, a message service or the like).

It is to be understood that the request from a given agency 16, 18 or 20 can include a different set of information from the information that is ultimately stored into the inventory structure 14 of the media management system. Accordingly, the MIS 12 can include mapping data 44, such as can define a set attributes and fields and a corresponding format for inventory data that is to be written to particular media inventory 14 of the media management system 22. The mapping data 44 can also provide a unique identifier for the inventory provider as well as a particular IP address (e.g., PO Box) for accessing the media management system 22 to facilitate extraction of the media inventory and placing such requests into each media management system. The mapping data 44 can also identify a corresponding automation system 46 that is employed for the distribution of media as scheduled by each media management system 22. The request processor 42 can also store relevant information from each request in the mapping data 44 to facilitate filtering and reporting as-run information as described herein.

The automation system 46 is programmed and configured to control distribution of media based upon the inventory and scheduling information provided by the media management system 22. Those skilled in the art will understand and appreciate that the management system 22 and the automation system 46 can be implemented separately or be integrated into a corresponding platform, such as traffic and automation product offerings in the H-CLASS platform commercially available from Harris Corporation of Melbourne, Fla., and its affiliated companies. Those skilled in the art will understand and appreciate other platforms or combinations of systems that can be implemented together to provide for the media management and automation functions for use in the system 10.

The automation system 46 can provide a set of as-run information that identifies details concerning each unit of inventory media that has been distributed over a given media. However, the full as-run information generated by the automation system 46 has more information than is needed by the respective agencies 16, 18 and 20. Additionally, there are business reasons why inventory owners may not want such full set of as-run information to be made available to the agencies. The automation system 46 can provide the as-run information to the MIS 12 through a corresponding automation adapter system 48. The media inventory service 12 includes an as-run reporting method 50 that is programmed to filter the full set of as-run information from the automation system 46 and provide a redacted set of as-run information that is relevant to each respective agency 16, 18 and 20.

The as-run information from the automation system 46 typically does not identify which agency 16, 18 and 20 booked a particular inventory spot. Accordingly, the as-run reporting method 50 can employ the mapping data 44 to ascertain which as-run data correspond to inventory spots requested by each agency. As mentioned above, for example, the request processor 42 can store spot identifying data and agency identifying data into the mapping data 44 for each request placed by the agencies 16, 18 and 20. The as-run reporting method 50 thus can employ this mapping 44 to implement a filter to sort agency specific as-run data relevant for each of the respective agencies 16, 18 and 20. The agency as-run data can be sent to or otherwise be made available to each of the respective agencies 16, 18 and 20. In this way, the inventory owner can remain in control of the full as-run information generated by the each automation system and still provide each agency 16, 18 and 20 with relevant as-run information to spots that it has booked.

The automation adapter system 48 can include any number of adapters according to the number of different types of automation systems. For instance, a given automation system can automatically distribute media content for one or more channel, as scheduled via a given traffic system in the media management system 22. An inventory owner can employ different types of automation systems from a variety of different manufacturers, each of which may require a different adapter that is programmed to access the as-run information. Thus, the automation adapter system is extensible to include adapters that can be added (or removed) to accommodate any combination of automation systems that may be utilized by the respective inventory owners.

Figure 2:
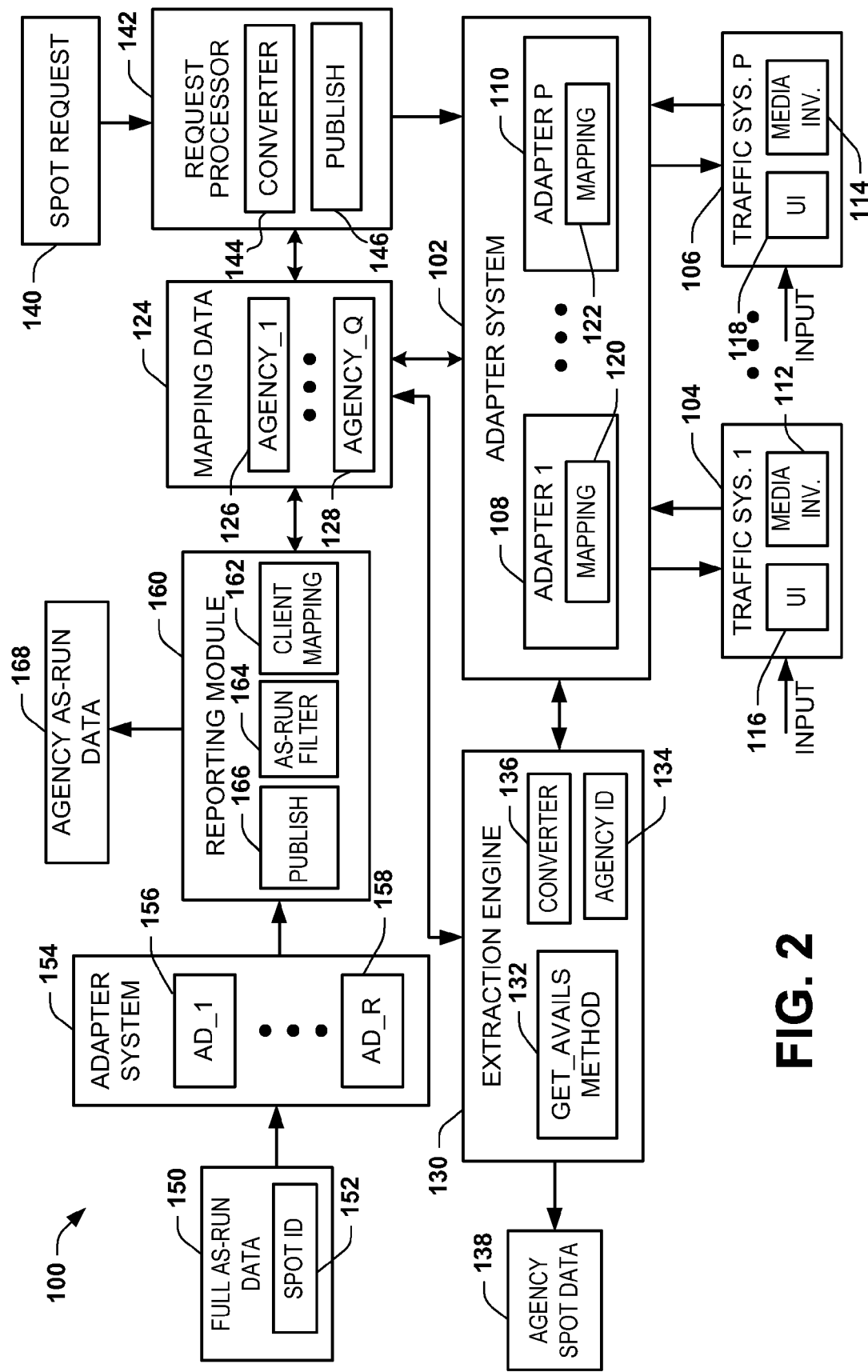
FIG. 2 depicts an example of a media inventory service system that can be implemented according to an aspect of the invention.

FIG. 2 depicts an example of a MIS system 100 that can be implemented according to an aspect of the invention. The MIS system 100 can be utilized to provide access to a selected subset of media inventory and related information by third party agencies while still allowing the inventory owner to maintain control over the media inventory and other sensitive information relating to the distribution of such media inventory. The MIS 100 includes an adapter system 102 that is programmed for interfacing the MIS 100 with each of a plurality of different traffic systems 104, 106. In the example of FIG. 2, the adapter system includes first through Pth adapters, represented as adapter 1 through adapter P, where P is a positive integer denoting the number of different types of traffic systems 104 and 106. There can be any number of disparate traffic systems from any number of different manufacturers, each of which may employ a different set of functions and methods.

For example, each of the traffic systems 104, 106 can be programmed to provide for one or more of traffic management, billing, and inventory analysis, operations management, business monitoring, rights management, or other functions relevant to the scheduling, distribution, or monitoring of media or the business associated with such media. Those skilled in the art will understand and appreciate that the MIS 100 can be utilized in conjunction with a variety of commercial traffic systems, such as the sales, traffic and billing software products available from Harris Corporation of Melbourne, Fla. as well as commercially available and proprietary products from other entities. Each of the adapters 108, 110 thus is programmed (e.g., as an API or logic) to provide for access to selected methods and functions of a respective one of the traffic systems 104 and 106.

Each of the traffic systems 104 and 106 includes a set of media inventory 112 and 114, which corresponds to the set of avails or inventory spots for each channel supported by the traffic system. Each of the traffic systems 104 and 106 also includes a mechanism, such as a user interface 116 and 118, which can be utilized by the inventory owner (e.g., an authorized user) to tag or otherwise identify a set of inventory spots or avails that are available to a given agency.

The media inventory 112 and 114 for each traffic system can be stored in memory and implemented as a database system, such as implemented according to a relational model or other database model. Each of the adapters 108 or 110 thus can be programmed to call one or more predefined procedures for accessing the media inventory in a respective one of traffic systems 104 or 106. Those skilled in the art will understand appreciate various types of stored procedures that may be available for performing functions, which functions and procedures may vary according to the database system used to store the media inventory 112 and 114 in each traffic system 104 and 106. For instance, the adapters 108 and 110 can employ stored procedures to retrieve result sets from the media inventory 112 and 114 in the traffic systems 104 and 106. Additionally, the adapters 108 and 110 can call stored procedures to modify the media inventory 112 and 114, such as in response to a request from a given agency as described herein. Each of the adapters 108 and 110 can also include mapping functions 120 and 122 that are programmed to ensure that data sent to each respective traffic systems 104 and 106 has the proper format and syntax.

An inventory owner can define (or assign) a set of one or more channels that each agency is afforded rights to a further selected subset of spots. The channels and the number and/or position of spots can be agreed upon a priori between each agency and the inventory owner. Thus, a selected subset of the media inventory 112 or 114 in a set of one or more predetermined channels (or schedules) can be tagged by the inventory owner via the respective user interface 116 or 118. The traffic systems 104 and 106 can publish or make available to the MIS 100 which channels (or schedules) can include spots for each given agency. More than one agency can be afforded access to the same channel, although typically only a single agency will be afforded access to a given spot. The set channels available to a given agency can be stored in memory associated with the MIS 100, such as in client mapping data 124.

The mapping data 124 can define relationships of data objects and data requirements for each of the traffic systems 104 and 106 to control access to the media inventory 112 and 114 for each of a plurality of agencies. In the example of FIG. 2, the mapping data 124 includes agency data, indicated at AGENCY_1 126 through AGENCY_Q 128, where Q is a positive integer denoting the number of agencies that have access to one or more of the traffic systems 104 and 106 via the MIS 100. At least a portion of the mapping data 124 (e.g., data object that defines relationships between agencies and traffic systems and automation systems) can be set for each agency that is to have access to media inventory, such as via the user interface 116 and 118 of the respective traffic systems 104 and 106. Thus, mapping data 124 can be defined for each agency across a plurality of different traffic systems which may correspond to any number of inventory owners. Other mechanism for programming the mapping data 124 can be provided via the MIS, such as an MIS manager. The MIS 100 thus can utilize the mapping data 124 to control access by the agencies to the media inventory 112 and 114 in each of the traffic systems 104 and 106. The mapping data 124 can also identify other parameters that facilitate and control the availability and publication of the inventory to a given agency.

The MIS system 100 also includes an extraction engine 130. The extraction engine 130 includes a get_avails method 132 that can be invoked by a respective agency through its appropriate API. Alternatively or additionally, the get_avails method 132 can be programmed to run at a predetermined time during the day, periodically or intermittently, which timing parameters can be fixed or be programmable, such as through the API of a given agency. Alternatively, the timing can be set by an associated traffic system. The extraction engine 130 employs agency identifier data 134 to control requests for each given agency to the traffic system 104, 106 through the adapter system 102. The agency identifier 134 can correspond to a predefined identifier (e.g., the tag data that is associated with spots in the media inventory) that is uniquely associated with each given agency. For instance, the agency identifier 134 for a given agency can be employed as an index to the mapping data 124 to obtain a set of information that can be employed to construct a query to one or more of the traffic systems 104 and 106. The particular traffic systems to which the query (or other stored procedure) is sent can be defined in the agency data 126 and 128 for each respective agency.

As mentioned above, the agency data 126 and 128 can also define a set of one or more channels (or schedules) to which a given agency might have access to for each respective traffic system 104 and 106. The get_avails method 132 thus sends a request to one or more adapters 108 and 110 to access media inventory 112 and 114 in one or more traffic systems. The adapter system 102 can issue a call to a corresponding stored procedure to query the media inventory database and retrieve a result set that includes the selected subset inventory data that has been made available to each respective agency by means of the tagging.

The extraction engine 130 thus receives the set of available spots (e.g., avails) from one or more traffic systems 104 and 106 via the adapter system 102. The extraction engine 130 includes a converter method 136 that is programmed to place the set of avails (from the result set) into an appropriate format for use by a given agency. The format can be a generic format globally applicable to all agencies. Alternatively, different agency-specific formats could be used, such as based on agency data 126 and 128 for each agency. The extraction engine 130 in turn provides the spot data to a given agency, indicated at 138. The spot data 138 can be provided in the form of a file or a set of files that includes data that defines the selected subset of inventory spots that have been made available to the respective agency. The file can include respective spots from across one or more traffic system, which may further be controlled by any number of one or more inventory owners. The spot data 138 thus can be sent to the appropriate web agency as a response through the agency's its API or by an agreed upon messaging protocol.

Figure 3:
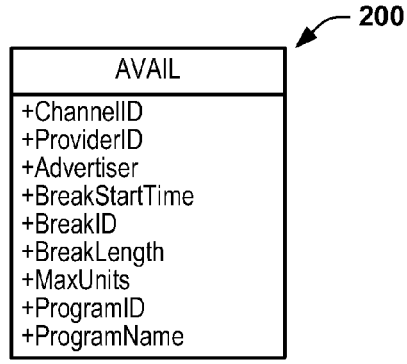
FIG. 3 depicts an example of an avail object that can be utilized to identify an available inventory spot.

FIG. 3 depicts an example of an avail data object 200 that can include attributes that describe an avail, such as can be provided in the agency spot data 138. The avail data object 200 thus can identify the channel, the provider (or a particular traffic system), as well as timing attributes for the avail (e.g., break start time, an ID for the break, length of the break, and a maximum units of content that can be supported in such break). The avail can also identify attributes for the program in which the avail resides (e.g., a unique ID for the program and the program name). Those skilled in the art will understand and appreciate various attributes that can be employed to define an avail for use in the MIS 100 according to an aspect of the invention.

Each agency thus can receive a set of available inventory that it can sell to third parties or otherwise dispose of, such as by placing its own inventory content. It is to be understood that an agency is not required to request a spot to be booked to each unit of media inventory that is made available to such agency. The number channels and the amount and position of such inventory in the channel can be set out in an agreement between each agency and the inventory owner, for example. A particular web agency can provide a spot request 140 to the MIS 100 through its API. A request processor 142 of the MIS 100 receives the spot request 140, processes the request so that one or more requests can be sent to the appropriate traffic system or traffic systems. The request processor 142 can include a converter 144 that formats the request from the agency into one or more request having a predetermined format that can be sent to one or more traffic systems 104 and 106.

For example, the spot request 140 from a given agency can include an agency identifier (e.g., the tag data that uniquely identifies the corresponding to the agency that provided the request) as well as data that describes a spot of media inventory and identifies or includes the advertising content for such spot. The converter 144 further may employ the mapping data 124 to ascertain the requirements for media inventory requests to each traffic system 104 and 106. Thus, the converter 144 can employ the agency data 126 or 128 for a given agency to convert the spot request 140 into one or more request configured according to the requirements of the traffic system 104 or 106 to which it will be placed.

The request processor 142 also includes a publish method 146 that is programmed to send the one or more request (encoded in the spot request 140) to the traffic systems. The particular form of the request and destination address for each request further can be defined in the mapping data 124. For instance, the agency identifier for a given spot request 140 can be employed to retrieve a set of parameters to control how the publish method 146 constructs the requests, including identifying a destination traffic system for each request, as well as other information need to route the request to the correct media inventory spot. The request processor 142 can also perform validation of each request, such as by confirming that the spot identified in a request is commensurate with one of the spots that was made available to such agency in the agency spot data 138. Alternatively or additionally, validation can be performed by the traffic systems 104 and 106.

Figure 4:
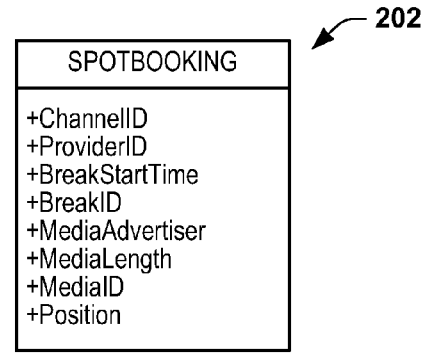
FIG. 4 depicts an example of a spot booking object that can be utilized to identify a desired inventory spot.

FIG. 4 depicts an example of a data object 202 that can be utilized to represent a request for a given avail that can be published to a given traffic system 104 or 106 by the request processor. The data object 202 corresponds to a request for booking a spot. The data object 202 thus can include data attributes that identify the channel (ChannelID) and traffic system (e.g., LPOKey and LPOName). The object can also identify the break for which the spot request is to be booked (e.g., BreakID and BreakStartTime). The data object also includes attributes that are set to identify the agency placing the request (e.g., the MediaAdvertiser) as wells identify and characterize the media content for the spot (e.g., MediaID and MediaLength). The position of the media content in the identified break can also be provided in the object 202 (e.g., Position). A corresponding entry can also be placed in the mapping data for each such object 202 which can be used to associate (or map) the spot being booked with the particular agency that issued such request. Those skilled in the art will understand and appreciate various attributes that can be employed to define a spot to be booked for use in the MIS 100 according to an aspect of the invention.

Referring back to FIG. 2, the publish method 146 publishes each converted request to the respective traffic system(s) via the adapter system 102. The adapter system 102 thus sends a request to one or more adapters 108 and 110 to access media inventory 112 and 114 in one or more traffic systems. For instance, each of the adapters 108 and 110 can issue a call to a corresponding stored procedure to change the attributes for one or more spots of media inventory database according to the spot requests issued by the agency. As mentioned above, each of the adapters 108 and 110 can employ a mapping function programmed to structure and arrange the spot data being stored in the media inventory according to specification requirements of the media inventory 112 and 114 for each traffic system. It is to be understood and appreciated that in one embodiment, the agency spot request 140 can correspond to a request for booking a spot. Additionally or alternatively, the request can correspond to an actual offer to purchase the identified spot, which can be accepted (automatically or manually) by the inventory owner.

While ideally advertisements are played out according to the schedule set by the traffic system 104 and 106, in practice, there can exist discrepancies between what is actually played by the automation system and what is scheduled to play by the traffic systems 104 and 106. Accordingly, one or more automation system is utilized to distribute the media inventory based on scheduling information for one or more channels of a respective traffic system. In response to media distribution, the automation system also provides full as-run information data 150 for each advertising spot that is distributed (e.g., broadcast to an audience).

The as-run information can be provided in the form of a log file or a message for a particular channel or set of channels supported by the automation system. The full as-run information includes information (e.g., attributes) that identifies the channel, the inventory owner, the actual time and date the content was played as well as other information associated with actual spot of media content. Status information can also be associated with the as-run data, which status characterizes the whether there was any discrepancy between what was scheduled and what was played. The status information can also identify the nature of the discrepancy, if any.

The full as-run data 150 is provided through an adapter system 154. Since there can be any number of different types of automation systems, adapter system 154 includes an adapter for each type of automation system, indicated as AD_1 156 through AD_R 158, where R is a positive integer denoting the number of different types of automation systems supported by the MIS 100. Thus, each adapter 156, 158 is programmed to receive full as-run data 150 from a respective type of automation system and to reformat and arrange the data into a format to facilitate subsequent processing in the MIS 100.

The MIS 100 also includes a reporting module 160 that is programmed to provide each agency a modified set of as-run information, such as can be limited to a subset of as-run information that is relevant to each given agency. The reporting module 160 includes a mapping function 162 and a filter 164 that cooperate to determine what subset of the as-run information is relevant to each agency and to provide agency-specific as-run data structures. A publishing method 166 generates agency as-run data 168 for use by each agency based on the agency-specific as-run data provided by the filter 164. For instance, the mapping function 162 analyzes selected attributes from the as-run data 150 from a respective automation system.

The mapping function 162 can employ the selected attributes to query the mapping data 124 to determine which of a plurality of agencies (if any) had issued a request corresponding to the media content described in the full as-run data 150. The results of the mapping can provide an agency identifier or other information that identifies which agency the as-run information is to be provided. The as-run filter 164 can employ the agency identifier that has been associated with the as-run data to construct one or more as-run data structures for each respective agency subscribing to the MIS 100. The publishing method 166 of the reporting module 160 can publish the agency as-run data 168 for use by each respective agency, which as-run data can include the as-run data for any number of one or more ads. The reporting module 160 can provide the agency as-run data 168 to a given agency as a log file for each channel, such as may be aggregated for the given agency over a predetermined time period. Alternatively, the reporting module 160 can provide the as-run data in response to a request from the agency.

Figure 5:
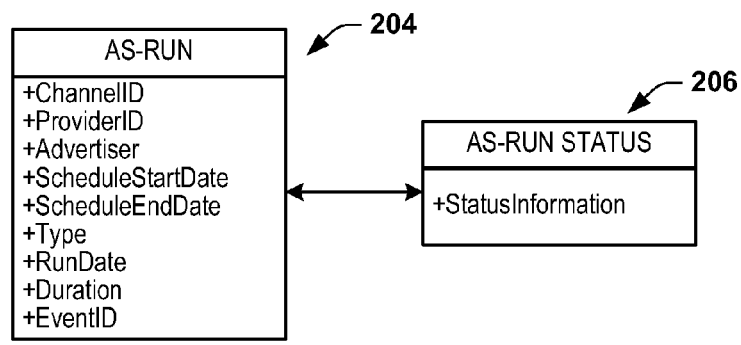
FIG. 5 depicts an example of an as-run object that can be utilized to describe as-run characteristics spot.

FIG. 5 depicts an example of an as-run data object 204, such as can be used by the reporting module 160 to provide the agency as-run data 168 for a scheduled spot in FIG. 2. As shown in FIG. 5, the as-run data object 204 can include attributes that identify the channel and traffic system to which the as-run information relates (e.g., respectively represented as ChannelID and ProviderID). An agency identifier can also be provided in the object 204, such as based on the mapping component 162 matching the information in the full as-run data 150 with corresponding mapping data 124. The as-run object can also include timing information associated with the scheduled time for the media content (e.g., ScheduleStartDate, ScheduleEndDate) and the actual time (e.g., RunDate, Duration). Information about the media content that was played can also be provided (e.g., an EventID and Type).

An as-run status object 206 can also be associated with each as-run entity object 204 to describe the nature of any discrepancy (if any) about the media that was scheduled and that was actually distributed. As one example, the status enumeration for the as-run object can include an indication of any one or more of the following status indicators: aired without discrepancy, technical difficulty, did not air, aired with duration discrepancy, aired with content discrepancy, preempted, joined in progress, inserted by operator, missing content or unknown. Those skilled in the art will understand and appreciate other attributes that can be employed to represent as-run information or its status for use in the MIS 100 according to an aspect of the invention.

Additionally, various ways can be implemented to control the amount of data and the frequency at which the agency as-run data is provided to each given agency, which control can be fixed for all agencies or be programmable according to agency requirements. Additionally, the agency as-run data 168 can be provided in a generic format for all agencies or such data can be customized according to the requirements of each respective agency. The as-run information thus can provide each agency with accurate information relating to each request that it has placed for media inventory. The agencies can utilize this information to ascertain details relating to the distribution of content for a spot that was booked (or for which an order has been placed). The agency, for example, can employ such information in an associated web service (which can be automatically provided to such service) as part of a reconciliation process, such as in connection with selling the spot to a third party.

Figure 6:
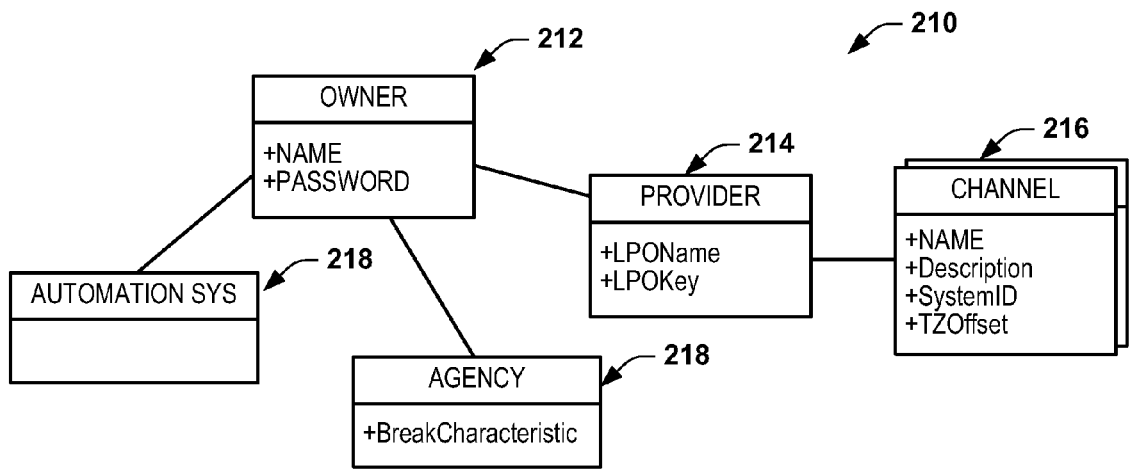
FIG. 6 depicts an example of an object client data model that can be utilized to represent object relationships for an inventory owner for use in a system according to an aspect of the invention.

FIG. 6 is a graphical depiction of an example object model 210 that can be utilized by an inventory owner to define relationships used by the MIS for each given agency. Instances of the object model can be stored in mapping data that is utilized by the methods and functions implemented as part of the MIS. The root node of the model is an Owner entity object 212 that identifies an inventory owner by including a Name and Password data attribute that can be defined each given owner. For instance, an owner can employ a user interface in a corresponding traffic system to establish relationships provided by this model 210 for each agency. The Name and Password data can be utilized to provide secure access by an inventory owner for creating additional instances of the object 210. The owner name can be implemented a unique name or identifier across all inventory owners, traffic systems, and automation systems with which the MIS operates.

The object model 210 also includes a provider object 214, such as includes attributes that identify a traffic system that is part of the model 210. The attributes of the provider object 214, for instance, include a name for the traffic system (e.g., LPOName) and an address or access key (e.g., LPOKey) that can be employed as a means for accessing the corresponding traffic system. One or more instances of a channel object 216 is associated with the provider object 214 to identify a set of one or more channels accessible to a given agency (identified by an agency object 218). The channel object 216, for example, includes a plurality of enumerated attributes that identify each channel for a given provider (e.g., traffic system) that is to be accessible to the associated agency. For example, the channel attributes can include a channel name (e.g., Name), a channel description (e.g., Description), an identifier for the system on which the channel exists (e.g., SystemID) and a time zone offset (e.g., TZOffset).

The object model 210 includes an automation object 220 that identifies one or more automation system that provide as-run information for the agency identified in an instance of the object model. Thus, the MIS can employ the automation object 220 to determine the source(s) of as-run information for each respective agency. An instance of the automation object can be dependent on the attributes for a provider object, since a given automation system can support selected channels of a given traffic system.

The agency object 218 identifies a given agency for which the model has been created by the inventory owner. The particular attribute of the agency object 218 can vary according to the type of provider or traffic system identified by the provider object 214. For example, one or more traffic system can include a "break characteristic" attribute that is associated with each avail. This attribute can be utilized by the inventory owner (e.g., via a user interface) to tag the avail with an agency identifier so as to make the spot available to the identified agency. Thus, an of the agency object 218 can be provided and programmed with the identifier for a given agency for which the spot is being made available. For instance, the inventory extractor of the MIS can employ the contents of a given instance of the agency object 218 for constructing queries to the traffic systems (identified by the provider object 214) for each respective agency.

As a further example with reference back to FIGS. 1 and 2, for a given agency, the extractor of the MIS (e.g., the extractor 28 of FIG. 1 or extraction engine 130 of FIG. 2) can access an instance of the object model 210 in conjunction with performing the get_avails method for the given agency. The extractor thus employs information from the instance of the object model for sending a corresponding request to a respective adapter corresponding to the traffic system (as identified by an instance of the provider object 214). The adapter can call a stored procedure to process the request from the extractor, which stored procedure can identify an enumerated set of one or more channels (as provided by an instance of the channel object 216). The called procedure accesses the media inventory of each identified traffic system (as provided by an instance of the provider object 214) and returns a selected subset of media inventory spots that have been tagged with the agency identifier for the given agency (as provided by an instance of the agency object 218) can be returned to the extractor. The extractor thus can provide a set of agency-specific data to the given agency. A similar process can be completed for multiple agencies, which may be performed sequentially or concurrently.

Figure 7:
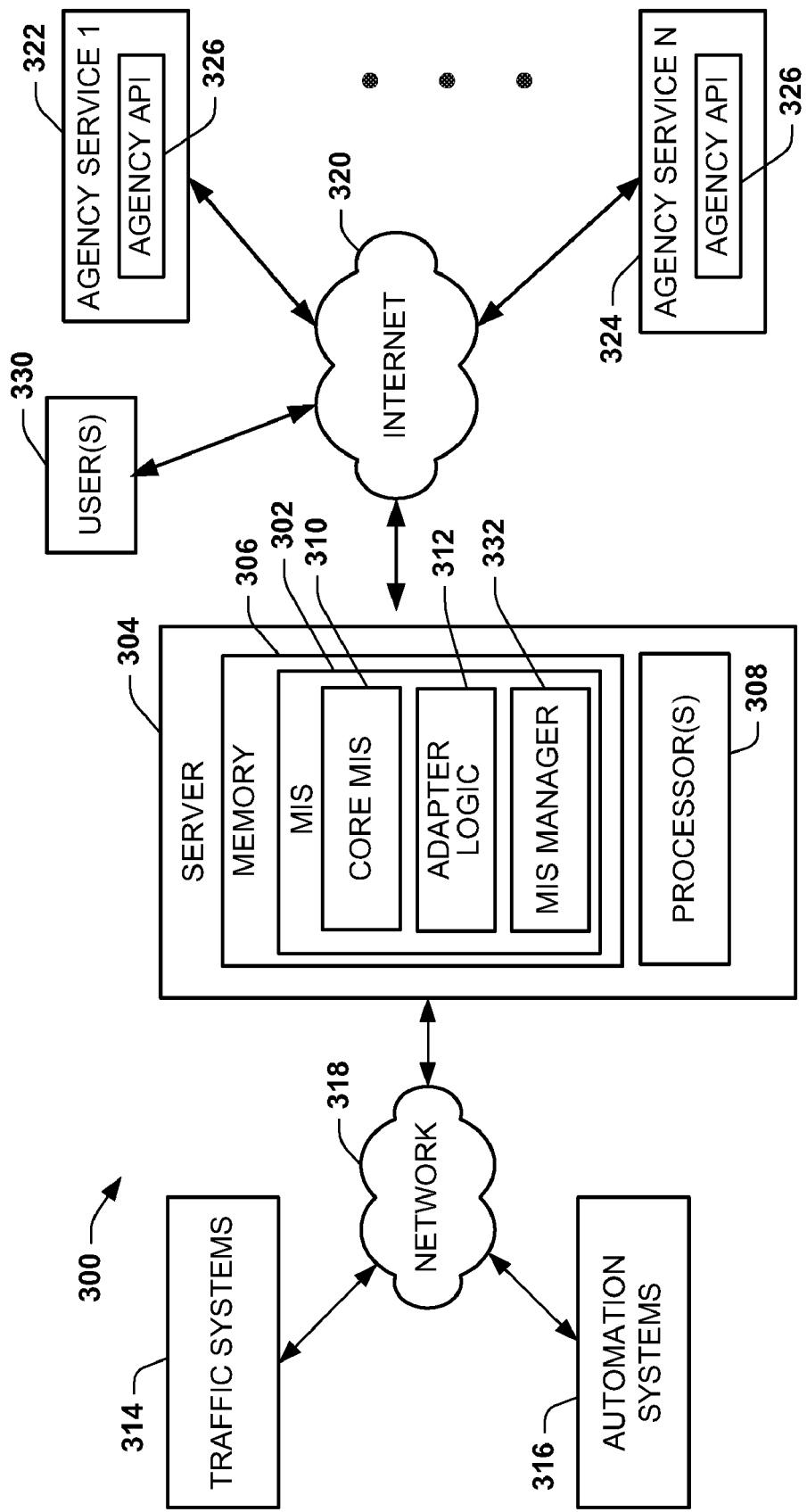
FIG. 7 depicts an example of computer network system that can implement a media inventory service platform according to an aspect of the invention.

FIG. 7 depicts an example of a computer system environment 300 that can be utilized for implementing a MIS 302 according to an aspect of the invention. In the example of FIG. 7, the system 300 includes a server 304 comprising the MIS 302. More specifically, the server 304 includes memory 306 that stores instructions that are executed by one or more processor 308 for performing the functionality of the MIS 302, such as shown and described herein.

Those skilled in the art will understand various types of memory devices that can be utilized to store the instructions corresponding to the MIS 302. Additionally, the processor can be implemented as any number of one or more processors that is coupled to the memory via a bus or any connection, either directly or indirectly, for executing the instructions and storing corresponding data associated with the methods being performed. The number of processors 308, the types of memory 306 and the communication interface between the memory and processor(s) generally will vary depending on the server architecture. The MIS 302 is equally applicable to and may run on any practically any type server.

At a high level, the MIS 302 can be considered to include core MIS functions 310 and adapter logic functions 312. The core MIS functions 310 can correspond to any combination of one or more of the extraction functionality (e.g., the extractor 28 of FIG. 1 or extraction engine 130 of FIG. 2), the request processing function (e.g., the request processor 42 of FIG. 1 and 142 of FIG. 2), the reporting function (e.g., the as-run reporting 50 of FIG. 1 and the as-run reporting module 160 of FIG. 2) as well as the interrelationships and data structures utilized to support such functionality.

The adapter logic functions 312 can correspond to any combination of the various adapters and interfaces that enable the core MIS 310 to communicate with the other applications and services in the system 300. Similar to as described herein, the system 300 can include any number of one or more traffic systems 314 and any number of one or more automation systems 316. In the example of FIG. 7, the server 304 is connected to each of the traffic systems and the automation systems via a network 318. This network 318 can be a local area network, a wide area network, such as including the internet 320, as well as include a combination of local and wide area networks. Alternatively, it will be appreciated that the server 304 can be directly connected to (or implemented in a common server system with) one or more of the traffic systems 314 and one or more of the automation systems 316. Thus, there exists a plurality of communication architectures that can be implemented, which are equally applicable to the system 300. As described herein, the adapter logic functions 312 thus can be programmed to provide for access to each of such traffic systems 314 and to each of such automation systems 316. The adapter logic functions 312 can be extensible to accommodate changes (e.g., additions or deletions) in the types of traffic systems, automation systems and agencies.

The adapter logic systems 312 also provide access to and from one or more agency servers, indicated at AGENCY SERVICE 1 322 and AGENCY SERVICE N 324, where N is a positive integer denoting the number of agency services having access to the MIS 302 (e.g., via subscription). For example, each of the agency services 322 and 324 can correspond to a server executing instructions for performing web services, such as may include the sale of media inventory spots. Each service 322 and 324 also includes an API 326 and 328, respectively, which specifies an interface and the behavior of the core MIS 310 functionality that can be implemented by each of the respective agency services. It will be appreciated that a single API can be designed for use by each agency to support access to the core MIS 310 by the services 322 and 324, and thereby provide access to various different traffic systems and automation systems.

By way of further example, any number of one or more other users 330 can be connected to the internet 320 for accessing services 322 and/or 324 provided by each respective agency. For example, the agency services 322 and 324 can provide web services programmed for selling the selected subset of inventory spots that the MIS 302 has made available to each of the agency servers 322 and 324. This selected inventory can be aggregated from across a plurality of different traffic systems 314 for a plurality of media inventory owners, such as described herein. The web services 322 and 324 of each agency further can be programmed to automatically (or manually in response to a user input) send requests (e.g., corresponding to the spot request 140 of FIG. 2) to the MIS 302 via the agency API 326 or 328, such as in response to requests or offers from the other user(s) 330. As one example, one or more of the web services 322 and 324 can offer the spots for sale in an online auction based format. Those skilled in the art will understand and appreciate that each agency service can be programmed according to any commercial strategy or business model to sell the selected subset of spots made available by the MIS 302 to each respective server. For instance, an agency can also utilize other mechanisms (e.g., sales persons, catalogs, third party web services and the like) to market the media inventory.

Each automation system 316 generates as-run information that is provided to an associated traffic system 314, such as by message provided via the network 318. The as-run information is also utilized by the MIS 302, such as for reporting agency-specific as-run data to each of the respective agency services 322 and 324. As described herein, the core MIS 310 can include an as-run reporting module (e.g., the as-run reporting 50 of FIG. 1, the reporting module 160 of FIG. 2) that is programmed to filter the full as-run information from a respective automation system. The filtering can be performed based on data stored in the memory 306 representing requests for advertising spots that have been placed by each respective service. The core MIS 310 in turn provides each respective service 322 and 324 with a set of agency specific as-run information, which can be utilized by the web services for reconciliation purposes with the purchasers of such spots.

A MIS manager 332 can also be associated with the MIS 302 for programming operating parameters for the MIS. For instance, the MIS manager can be utilized to program mapping data (e.g., including a core data objects 210 of FIG. 6). Additionally or alternatively, the MIS manager 332 can provide a mechanism for programming additional adapters, such as the management system adapters, automation system adapters, agency adapters, or any combination thereof. Those skilled in the art may understand additional feature that can be programmed via the MIS manager 332 based on the teachings contained herein.

In the example of FIG. 7, each of the agency services 322 and 324 communicate with the MIS 302 via a wide area network, such as the Internet 320. It will be understood that the example of the network architecture depicted in FIG. 7 is provided by way of example and not intended to be exhaustive of the possible approaches that an agency can access the MIS 302 nor is it to be considered exhaustive for providing communication between the MIS and the traffic systems 314 and between the MIS and the automation systems 316.

In view of the foregoing, it will be understood and appreciated that the MIS can be implemented as part of a platform to integrate disparate media systems. By using the MIS, each agency can be provided access to certain media inventory, which it can resell. However, the inventory maintains control over its full inventory. Additionally, each agency can be afforded access to as-run information for the spots each respective agency has placed requests (e.g., spot bookings or orders), without requiring that the inventory owner reveal details of the full as-run information for each channel. As a result, the inventory owner can maintain control of sensitive and proprietary information while creating additional revenue opportunities by selectively releasing a portion of its existing and available media inventory.

What have been described above are examples and embodiments of the invention. It is, of course, not possible to describe every conceivable combination of components or methodologies for purposes of describing the invention, but one of ordinary skill in the art will recognize that many further combinations and permutations of the present invention are possible. Accordingly, the invention is intended to embrace all such alterations, modifications and variations that fall within the scope of the appended claims. In the claims, unless otherwise expressly indicated, the article "a" is to refer to "one or more than one."

What is claimed is:

1. A computer-implemented method, the method comprising:
   selectively extracting, by at least one computer system, inventory data corresponding to at least one scheduled media broadcast from at least one media management system based on an agency identifier tag that defines a subset of the inventory data in the at least one media management system made available for a given agency;
   providing, by the at least one computer system, agency inventory data based on the extracted inventory data for use by the given agency, the agency inventory data enumerating at least one inventory spot in the at least one scheduled media broadcast that is available for the given agency;
   receiving, by the at least one computer system, at least one request from the given agency for the at least one inventory spot;
   causing, by the at least one computer system, a portion of the inventory data in the at least one media management system to be modified according to the at least one request; and
   enabling content specified by the given agency to be played in the at least one inventory spot in response to the portion of the inventory data being modified according to the at least one request.

2. The computer-implemented method of claim 1, wherein the agency identifier tag comprises a predetermined identifier that distinguishes the given agency from other agencies, the predetermined identifier being inserted into a predetermined field of the inventory data of the at least one media management system.

3. The computer-implemented method of claim 1, further comprising associating, by the at least one computer system, the agency identifier tag with the subset of inventory data in the at least one media management system according to agreed upon terms between the given agency and an entity owner of inventory represented by the inventory data stored in the at least one media management system.

4. The computer-implemented method of claim 1, wherein the at least one media management system comprises a plurality of disparate traffic systems, each of the plurality of disparate traffic systems being programmed with a plurality of inventory spots defined by corresponding inventory data, at least some of the inventory data having tag data corresponding to the agency identifier to define a subset of the corresponding inventory data that has been made available for the given agency.

5. The computer-implemented method of claim 4, further comprising adapting inventory data that is extracted from and provided to each of the plurality of traffic systems, the adapting varies for each of the plurality of traffic systems according to inventory data object requirements specified for each of the plurality of traffic systems.

6. The computer-implemented method of claim 1, further comprising:
   receiving as-run information from at least one automation system that is associated with the at least one media management system;

filtering the as-run information based on mapping data to provide agency as-run data that is related to the given agency; and publishing the agency as-run data for use by the given agency.

7. The computer-implemented method of claim 6, wherein the at least one media management system comprises a plurality of different traffic systems, and wherein the as-run information is received from a plurality of automation systems, the method further comprising adapting the as-run information received from the plurality of different automation systems to provide adapted as-run information, the agency as-run data being published based on the adapted as-run information.

8. The computer-implemented method of claim 1, further comprising converting the extracted inventory data to the agency inventory data according to mapping data that defines relationships between requirements for the given agency and the inventory data stored in the at least one media management system.

9. The computer-implemented method of claim 1, wherein the inventory data in the at least one media management system comprises avails for a plurality of media spots in the at least one scheduled media broadcast for a plurality of different channels.

10. The computer-implemented method of claim 1, wherein the at least one request at least one of identifies and includes a copy of media content that is to be distributed to an audience for the at least one inventory spot, the causing further comprising:

converting, by the at least one computer system, the at least one request into corresponding inventory data according to an inventory data object stored in a mapping data structure for the at least one media management system; and publishing, by the at least one computer system, the corresponding inventory data to the at least one media management system so that the portion of the inventory data in the at least one media management system is modified based on the at least one request.

11. The computer-implemented method of claim 1, wherein an extent of the subset of the inventory data in the at least one media management system that is made available for the given agency is determined by a relationship between the given agency and an inventory owner that operates the at least one media management system, at least a portion of the relationship being represented by an instance of an object model that is used by at least one of the extracting and the causing.

12. The computer-implemented method of claim 1, wherein the computer-implemented method comprises a media inventory service that is accessible by the given agency via the internet, an instance of the media inventory service being instantiated by the given agency via an application interface for performing the method.

13. The computer-implemented method of claim 1, further comprising setting each of a plurality of different agency identifiers tags associated with different subsets of the inventory data stored in the at least one media management system, each of the plurality of different agency identifiers tags distinguishing between each of a plurality of different agencies for which the different subsets of the inventory data is being made available.

14. A media inventory system comprising:

an inventory extractor programmed to access a copy of media inventory data corresponding to at least one scheduled broadcast from the at least one media management system corresponding to a selected subset of the inventory data in the at least one media management system that has been tagged via the at least one media management system as being available for a given agency, the inventory extractor being programmed to provide agency inventory data corresponding to the selected subset of the inventory data for use by the given agency; and a request processor programmed to receive at least one request from the given agency for at least one inventory spot in the at least one scheduled media broadcast corresponding to at least a portion of the agency inventory data provided by the inventory extractor, the request processor causing selected inventory data in the at least one media management system to be modified according to the at least one request, the content specified by the given agency being played in the at least one inventory spot based on the selected inventory as modified according to the at least one request.

15. The media inventory system of claim 14, further comprising an as-run reporting method programmed to filter full as-run information received from at least one automation system based on mapping data to provide a subset of agency specific as-run data that is related to the at least one request from the given agency.

16. The media inventory system of claim 15, wherein the at least one media management system comprises a plurality of different traffic systems in communication with the inventory extractor, the as-run reporting method receiving the full as-run information from a plurality of automation systems based on the media inventory scheduled for channels via respective ones of the plurality of different traffic systems, the system further comprising:

an automation adapter associated with each type of the plurality of automation systems for adapting the full as-run information received from respective the plurality of automation systems, the as-run reporting method providing the agency specific as-run data for use by the given agency based on the adapted as-run information.

17. The media inventory system of claim 14, wherein the at least one media management system further comprises a user interface programmed to tag the selected subset of the inventory data.

18. The media inventory system of claim 14, wherein the at least one media management system comprises a plurality of different types of media management systems, the system further comprising a management adapter system that includes a respective adapter associated with each of the plurality of different types of media management systems to enable communication between the inventory extractor and to enable communication between the request processor and each of the plurality of different types of media management systems.

19. The media inventory system of claim 18, wherein the request processor further comprises a publishing method programmed to publish spot data received in the at least one request from the given agency to a corresponding one of the plurality of different types of media management systems according to mapping data associated with the given agency via a corresponding adapter of the management adapter system.

20. The media inventory system of claim 14, wherein the inventory extractor and the request processor comprise methods implemented by a server that is in communication with the given agency via a wide area network.

21. A computer system comprising:
a first computer that executes instructions for performing a method that comprises:
  providing agency specific inventory data corresponding to a copy of tagged inventory data corresponding to at least one scheduled broadcast from inventory data stored in a plurality of media management systems, the agency specific inventory data enumerating a set of at least one inventory spot in the at least one scheduled media broadcast made available for a given agency;
  causing selected inventory data in at least one of the plurality of media management systems to be modified according to at least one request received from the given agency; and
  enabling content specified by the given agency to be played in the at least one inventory spot based on the portion of the inventory data being modified according to the at least one request; and
a second computer that executes instructions for providing the at least one request via an interface that provides access to the method of the first computer, the second computer being in communication with the first computer via a network.

22. The computer system of claim 21, wherein the network comprises the internet.

23. The computer system of claim 21, further comprising a third computer in communication with the first computer, the third computer implementing at least one traffic system that is part of a respective one of the plurality of media management systems, the at least one traffic system comprising a user interface programmed to tag the inventory data to define the tagged inventory data.

24. The computer system of claim 23, further comprising a fourth computer in communication with the first computer and the third computer, the fourth comprising executable instructions for performing a method that comprises providing as-run information associated with media distributed by an automation system according to the inventory data from the at least one traffic system.

25. The computer system of claim 21, wherein the interface comprises a predetermined application programming interface that is employed by a web service running in the second computer, the second computer being part of the given agency.

* * * * *